(12) United States Patent
Agrawal (10) Patent No.: US 8,751,502 B2
(45) Date of Patent: Jun. 10, 2014

(54) VISUALLY-REPRESENTED RESULTS TO SEARCH QUERIES IN RICH MEDIA CONTENT

(75) Inventor: Rakesh Agrawal, Arlington, VA (US)

(73) Assignee: AOL Inc., Dulles, VA (US)

( * ) Notice: Subject to any disclaimer, the term of this patent is extended or adjusted under 35 U.S.C. 154(b) by 2306 days.

(21) Appl. No.: 11/321,044

(22) Filed: Dec. 30, 2005

(65) Prior Publication Data

US 2007/0124298 A1    May 31, 2007

Related U.S. Application Data

(60) Provisional application No. 60/740,276, filed on Nov. 29, 2005.

(51) Int. Cl.
*G06F 7/00* (2006.01)
*G06F 17/30* (2006.01)

(52) U.S. Cl.
CPC ....... *G06F 17/30017* (2013.01); *Y10S 707/913* (2013.01); *Y10S 707/914* (2013.01)
USPC ............ 707/739; 707/771; 707/913; 707/914

(58) Field of Classification Search
CPC .................. G06F 17/30017; G06F 17/30696; G06F 17/30716; G06F 17/30056; G06F 17/30781
See application file for complete search history.

(56) References Cited

U.S. PATENT DOCUMENTS

| | | | |
|---|---|---|---|
| 5,751,286 A | 5/1998 | Barber et al. | |
| 5,828,839 A | 10/1998 | Moncreiff | |
| 5,835,087 A | 11/1998 | Herz et al. | |
| 5,905,981 A * | 5/1999 | Lawler | 707/4 |
| 5,907,837 A * | 5/1999 | Ferrel et al. | 707/3 |
| 6,049,806 A | 4/2000 | Crecine | |
| 6,112,203 A | 8/2000 | Bharat et al. | |
| 6,166,735 A * | 12/2000 | Dom et al. | 707/103 R |
| 6,327,590 B1 | 12/2001 | Chidlovskii et al. | |
| 6,385,602 B1 | 5/2002 | Tso et al. | |
| 6,681,370 B2 | 1/2004 | Lawrence et al. | |
| 6,691,106 B1 | 2/2004 | Sathyanarayan | |
| 6,714,909 B1 * | 3/2004 | Gibbon et al. | 707/3 |
| 6,823,370 B1 | 11/2004 | Kredo et al. | |
| 6,901,207 B1 | 5/2005 | Watkins | |
| 6,963,867 B2 | 11/2005 | Ford et al. | |
| 7,209,942 B1 | 4/2007 | Hori et al. | |
| 7,281,220 B1 | 10/2007 | Rashkovskly | |
| 7,367,043 B2 | 4/2008 | Dudkiewicz et al. | |

(Continued)

OTHER PUBLICATIONS

Loren Baker, Blinkx TV: More Video Than Google, Yahoo or YouTube, Search Engine Journal (Jun. 14, 2006), 7 pages.

(Continued)

*Primary Examiner* — Anh Tai Tran
(74) *Attorney, Agent, or Firm* — Finnegan, Henderson, Farabow, Garrett & Dunner, LLP (57) ABSTRACT

When executed, a computer program product generates a graphical user interface that renders results that are responsive to a search query of a rich media file. The graphical user interface includes a chronological representation of the rich media file, one or more occurrence markers along the chronological representation corresponding to actual occurrences of a desired term at an indicated chronological location in the rich media file, and an execution icon configured to launch a rich media application that renders a relevant portion that is responsive to the search query.

20 Claims, 9 Drawing Sheets

(56) References Cited

U.S. PATENT DOCUMENTS

| | | |
|---|---|---|
| 7,440,976 B2 | 10/2008 | Hart et al. |
| 8,132,103 B1 | 3/2012 | Chowdhury et al. |
| 2002/0069218 A1 | 6/2002 | Sull et al. |
| 2002/0133826 A1 | 9/2002 | Ohyama |
| 2002/0184336 A1 | 12/2002 | Rising, III |
| 2003/0093790 A1 | 5/2003 | Logan et al. |
| 2003/0182220 A1 | 9/2003 | Galant |
| 2003/0235407 A1 | 12/2003 | Lord |
| 2004/0059720 A1* | 3/2004 | Rodriguez .................. 707/3 |
| 2004/0098754 A1 | 5/2004 | Vella et al. |
| 2004/0114571 A1 | 6/2004 | Timmins et al. |
| 2004/0220926 A1 | 11/2004 | Lamkin et al. |
| 2005/0091694 A1 | 4/2005 | Rambo |
| 2005/0114324 A1 | 5/2005 | Mayer |
| 2005/0114449 A1 | 5/2005 | Vergaeghe et al. |
| 2005/0128361 A1 | 6/2005 | Li et al. |
| 2005/0144086 A1 | 6/2005 | Speiser et al. |
| 2006/0059134 A1 | 3/2006 | Palmon et al. |
| 2006/0071950 A1 | 4/2006 | Kurtzweil et al. |
| 2006/0167857 A1 | 7/2006 | Kraft et al. |
| 2006/0167864 A1 | 7/2006 | Bailey et al. |
| 2006/0179051 A1 | 8/2006 | Whitney et al. |
| 2006/0218573 A1 | 9/2006 | Proebstel |
| 2006/0224552 A1 | 10/2006 | Riezler et al. |
| 2007/0005564 A1 | 1/2007 | Zehner |
| 2007/0088603 A1 | 4/2007 | Jouppi et al. |
| 2007/0094247 A1 | 4/2007 | Chowdhury et al. |
| 2007/0112817 A1 | 5/2007 | Danniger |
| 2007/0130563 A1 | 6/2007 | Elgazzar et al. |
| 2007/0143778 A1 | 6/2007 | Covell et al. |
| 2007/0156677 A1 | 7/2007 | Szabo |
| 2007/0208719 A1 | 9/2007 | Tran |
| 2007/0226183 A1 | 9/2007 | Hart et al. |
| 2007/0261099 A1 | 11/2007 | Broussard et al. |
| 2007/0300258 A1 | 12/2007 | O'Connor et al. |
| 2008/0005118 A1 | 1/2008 | Shakib et al. |
| 2008/0155627 A1 | 6/2008 | O'Connor et al. |
| 2012/0150907 A1 | 6/2012 | Chowdhury et al. |

OTHER PUBLICATIONS

How to Create Quicktime Movie Quotes, Mefeedia Blog (Jul. 2, 2005), 3 pages.
International Search Report issued in International Application No. PCT/US07/73999, dated Jul. 7, 2008, 8 pages.
Lada Adamic and Eytan Adar, How to Search a Social Network, Elsevier (2005), 17 pages.
Eugene Agichtein, Eric Brill, and Susan Dumais, Improving Web Search Ranking by Incorporating User Behavior Information, SIGIR (2006), 8 pages.
Ngo Chi Lang, A Tolerance Rough Set Approach to Clustering Web Search Results, Warsaw University (Dec. 2003), 79 pages.

\* cited by examiner

FIG. 1 results for katrina   1-10 of 100    sort by: relevance: date learn more about your podcast search

Katrina hits the gulf coast

September 16, 2005 – Lorum ipsum dolor sit amet...

Source: Larry King Live

Preview Podcast    220    Play Full Podcase (02.05.13)

FIG. 5 results for katrina     1-10 of 100                    sort by: relevance: date Learn more about your podcast search

Katrina hits the gulf coast

September 16, 2005 – Lorum ipsum dolor sit amet...

Source: Larry King Live

Preview Podcast                                           Play Full Podcase (02.05.13)

VISUALLY-REPRESENTED RESULTS TO SEARCH QUERIES IN RICH MEDIA CONTENT

CROSS REFERENCE TO RELATED APPLICATION

This application claims priority to U.S. Provisional Application No. 60/740,276, filed Nov. 29, 2005 and titled "Visually-Represented Results to Search Queries in Rich Media Content," which is incorporated by reference.

TECHNICAL FIELD

This document relates to accessing rich media content.

BACKGROUND

The growth of communications networks, such as the Internet, enables access to wide varieties of content.

SUMMARY

In one general sense, content may be rendered by receiving a rich media file, analyzing the rich media file to identify a term within the rich media file, associating the term with one or more time values specifying a chronological location in the rich media file for the term, receiving a search query, relating the search query to the term, displaying a chronological representation of search results in response to relating the terms to the search query, and enabling a user to interact with the search results to launch a rich media application that renders a relevant portion of the rich media file that is responsive to the search query.

Implementations may include one or more of the follow features. For example, displaying the chronological representation may include displaying one or more text transcripts associated with the search results or displaying a multi-occurrence icon representing two or more occurrences of the desired term that occur within a predetermined chronological proximity. Displaying the chronological representation may include indicating a number of occurrences of the desired term within the predetermined chronological proximity.

Receiving the rich media file may include receiving at least one of audio or video content. Enabling the user to interact with the search results may include enabling the user to interact with an execution icon configured to render the relevant portion by beginning to render the relevant portion at a predetermined amount of time in advance of the actual occurrence of the desired term such that rendering includes contextual content in addition to the desired term. Rendering the relevant portion with the contextual context may include selecting a sufficient amount of the contextual content to make the rendering of the desired term meaningful or selecting the contextual context based on breaks in content or a rendering of sound effects that are associated with segments of a program to identify the contextual content.

Segment icons responsive to the search query may be rendered that are structured and arranged to indicate different segments in the rich media file. The user may be enabled to render the rich media file at a user-specified chronological location relative to the actual occurrence of the desired term.

Implementations of any of the techniques described may include a method or process, an apparatus or system, or computer software on a computer-accessible medium. The details of particular implementations are set forth below. Other features will be apparent from the description and drawings, and from the claims.

DETAILED DESCRIPTION

Rich media files (e.g., video or audio content) may be made more accessible by configuring content to be searchable such that a GUI enables a user to launch a rich media application that renders a relevant portion in response to a search query. While volumes of rich media content are available, accessibility of the rich media content may be improved by enabling users to access relevant portions of content (i.e., the portions of a rich media file that are responsive to the search query).

For example, a rich media file may be received by a host and analyzed to identify terms within the rich media file. Each term may be associated with one or more time values specifying a chronological location in the rich media file for the term. A search query is related to the term and a chronological representation of the search result is displayed in response to relating the term to the search query. A user is enabled to interact with the search result to launch a rich media application that renders a relevant portion of the rich media file that is responsive to the search query.

In one implementation, a GUI renders results in response to a search query of a rich media file. The GUI includes a chronological representation of the rich media file, one or more occurrence markers along the chronological representation corresponding to an actual occurrence of a desired term at an indicated chronological location in the rich media file, and an execution icon configured to launch a rich media application that renders a relevant portion of the rich media file that is responsive to the search query.

For example, a user researching news coverage of new medicines may search video coverage of recent developments. Using the GUI, the user may perceive which video files (i.e., which rich media files) include relevant content. More precisely, a user may perceive a chronological representation of which portions of a video file include relevant content. By indicating which video files include results that are responsive to a search query, and by indicating which specific portions of the video file are relevant, the user may better understand how a particular search is relevant to the user's interest. This understanding may, in turn, enable the user to save time and/or enable the user to better tailor the user's efforts.

Figure 1:
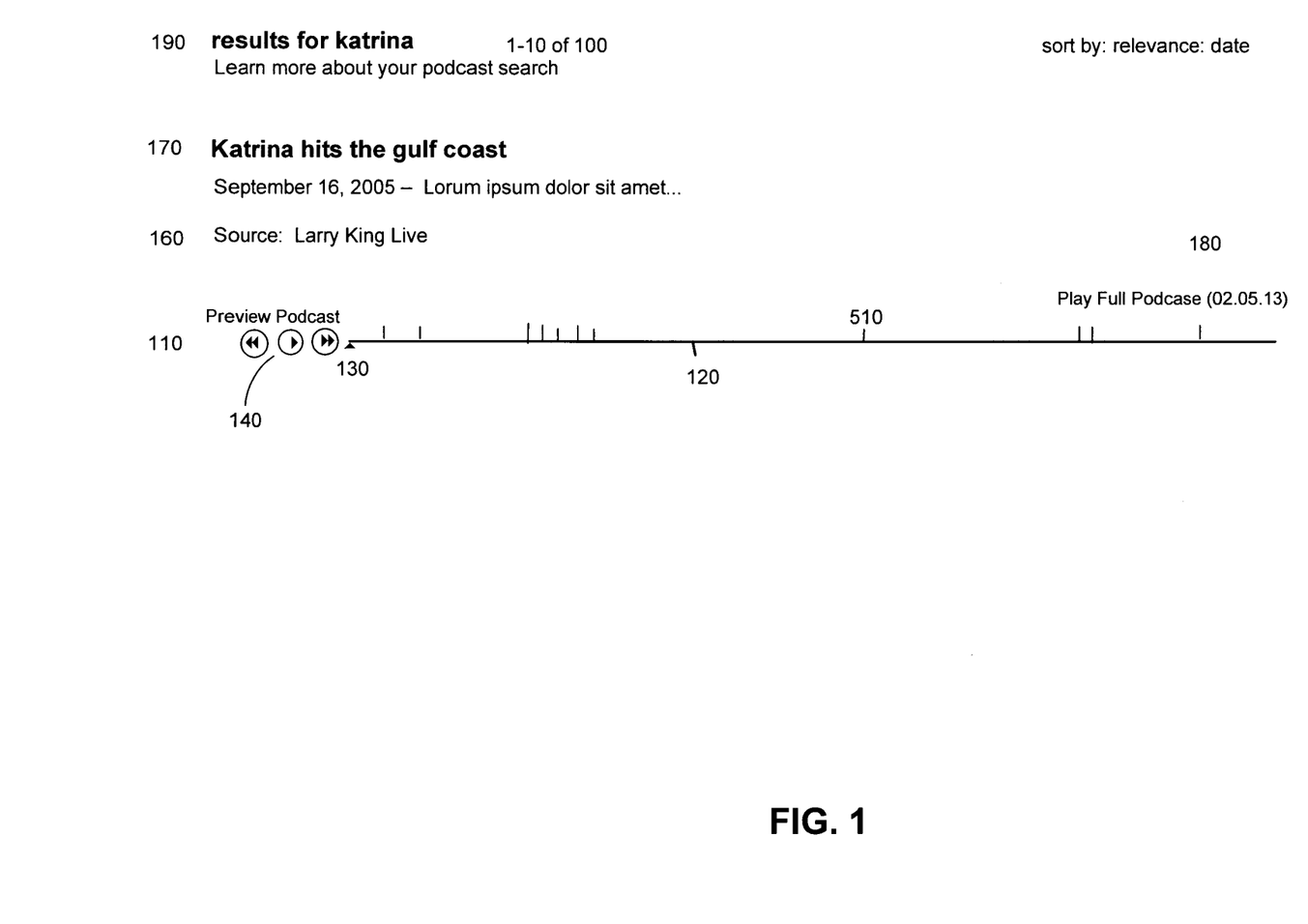
FIG. 1 illustrates a graphical user interface (GUI) configured to render search results of a rich media file.

FIG. 1 illustrates a GUI 100 configured to render search results of a rich media file. The chronological representation 120 of a rich media file 110 is rendered as a horizontal timeline along the bottom of the figure. The leftmost point of the timeline is chronologically more proximate to the beginning of the rich media file, and the rightmost point of the timeline is chronologically more proximate to the end of the rich media file.

The selection indicator icon 130 indicates a chronological point of reference that is used when an execution icon 140 is selected. The occurrence icons 150 illustrate occurrences of terms that are responsive to a search query along the chronological representation 120. Execution icon 140, shown as a play button with a triangle in between "fast forward" and "rewind" controls, enables a user to launch a rich media application that renders a relevant portion of a rich media file (e.g., a portion at the indicated point along the chronological representation 120).

A source information line 160 displays a source of the content, a file name, and/or other identifying features. A subject information line 170 displays a brief description of the subject of the file. As shown, the subject information line 170 includes a date for the result as "Sep. 15, 2005" and proceeds with an exemplary summary "Lorum ipsum dolor sit amet . . . " The subject information line 170 could have included another summary such as "Recovery efforts to Hurricane Katrina have been aided by the Coast Guard." A timer 180 displays a chronological length of the chronological representation 120. A search results line 190 displays a number of overall search results to the search query and a numerical indication of the results shown on the page. A sorting line 195 displays a basis by which results are displayed (e.g., date or relevance).

Figure 2:
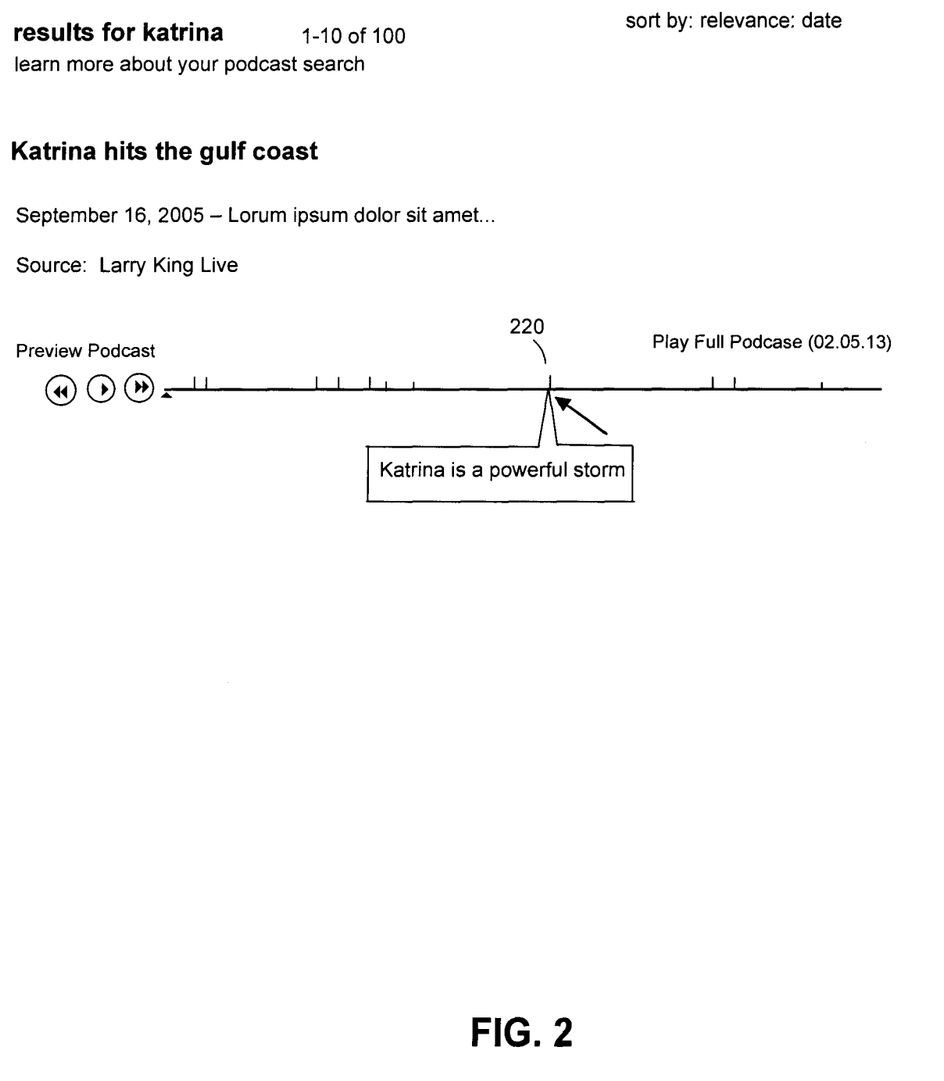
FIG. 2 illustrates a GUI configured to render text transcripts associated with search results of a rich media file.

Generally, FIGS. 2-6 illustrate different implementations of a media player application (e.g., GUI 100 in FIG. 1) configured to display chronological representations of search results. For example, FIG. 2 illustrates a GUI 200 configured to render text transcripts 220 associated with search results of a rich media file. The text transcripts 220 include a brief text excerpt of the terms before and after an occurrence of a term appearing in a search query.

Figure 3:
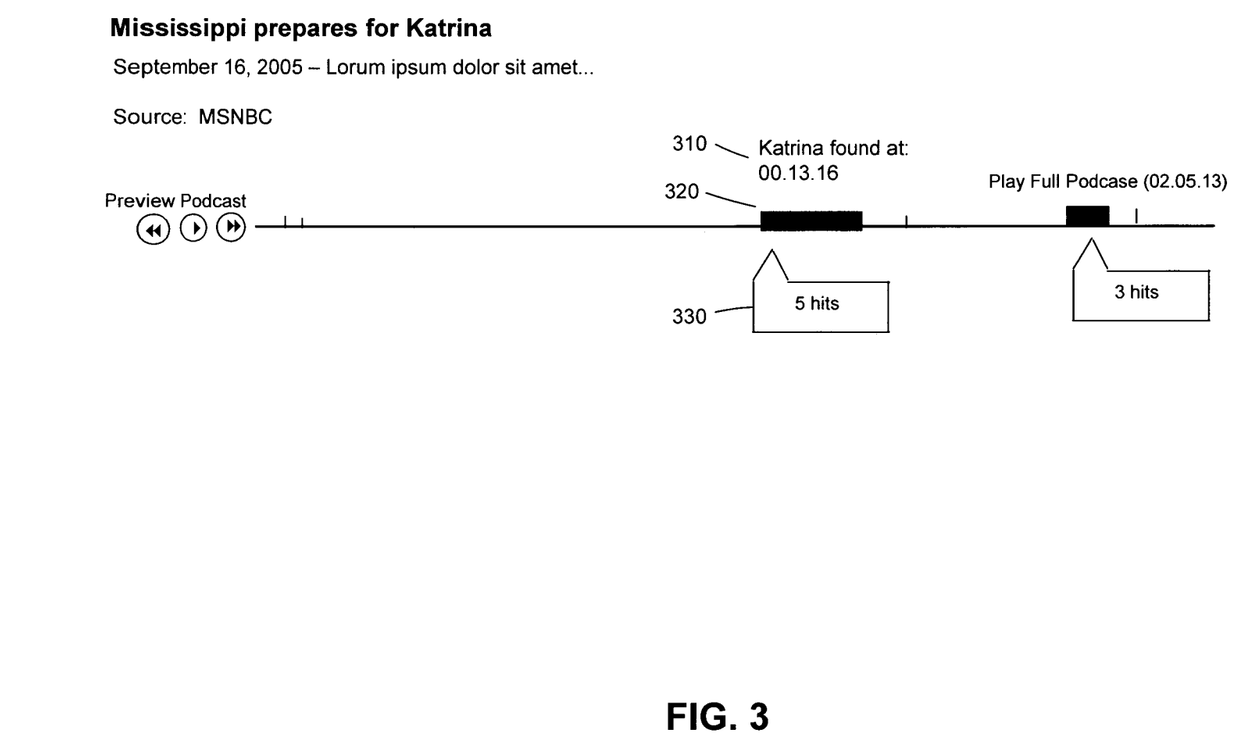
FIG. 3 illustrates a GUI configured to render multi-occurrence icons representing two or more occurrences that occur within a predetermined chronological proximity in response to a search query.

FIG. 3 illustrates a GUI 300 configured to render multi-occurrence icons 310 and 320 representing two or more term occurrences within a predetermined chronological proximity that are responsive to a search query. Each of the multi-occurrence icons 310 and 320 features a numerical indication 330 of the number of term occurrences associated with the icon.

Figure 4A:
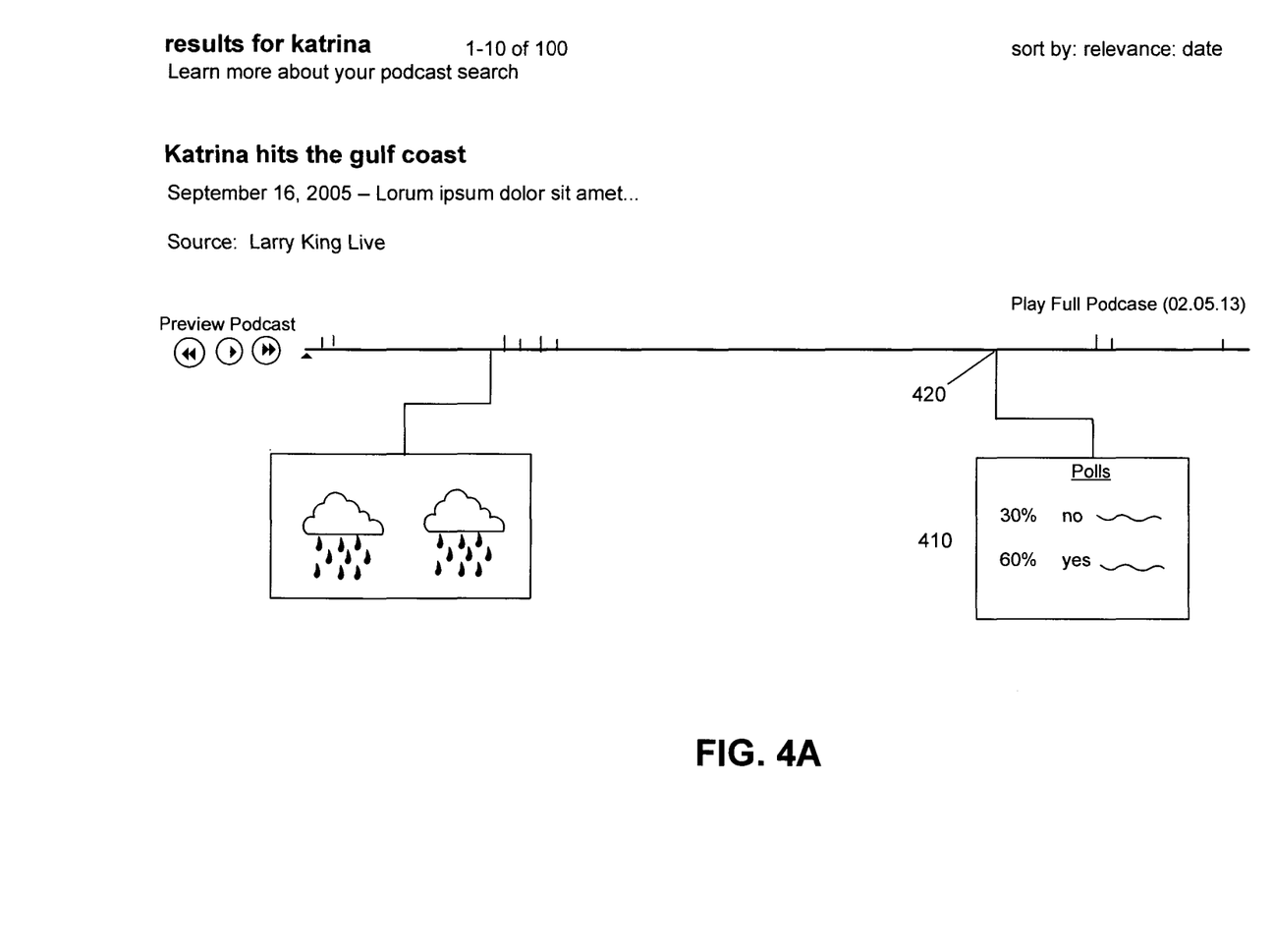
FIG. 4 illustrates a GUI configured to render an image from a video file when results responsive to a search query are rendered.

FIG. 4 illustrates a GUI 400 that is configured to render an image from a video file when results that are responsive to a search query are rendered. The search results include still frames 410 that are associated with occurrence icons 420.

In one implementation, a host receives a rich media file and analyzes the imagery within the rich media file. The host may analyze the rich media file for certain classes of images or desired subject matter (e.g., media personalities). For example, a host operated by a search provider may scan frames from a video file to identify overlaid graphics after determining that users often find overlaid graphics to feature particularly meaningful content (e.g., polling results in political news programs). As a result, when the host provide results that include the video file with the specified classes of images and/or subject matter, the host may provide the results in such a manner as to enable display of specified images. In one configuration, the host only provides specified classes of images that lie within a specified proximity to a term appearing in a search query. In another configuration, the host provides the specified classes of images irrespective of proximity to a term appearing in a search query.

Figure 5:
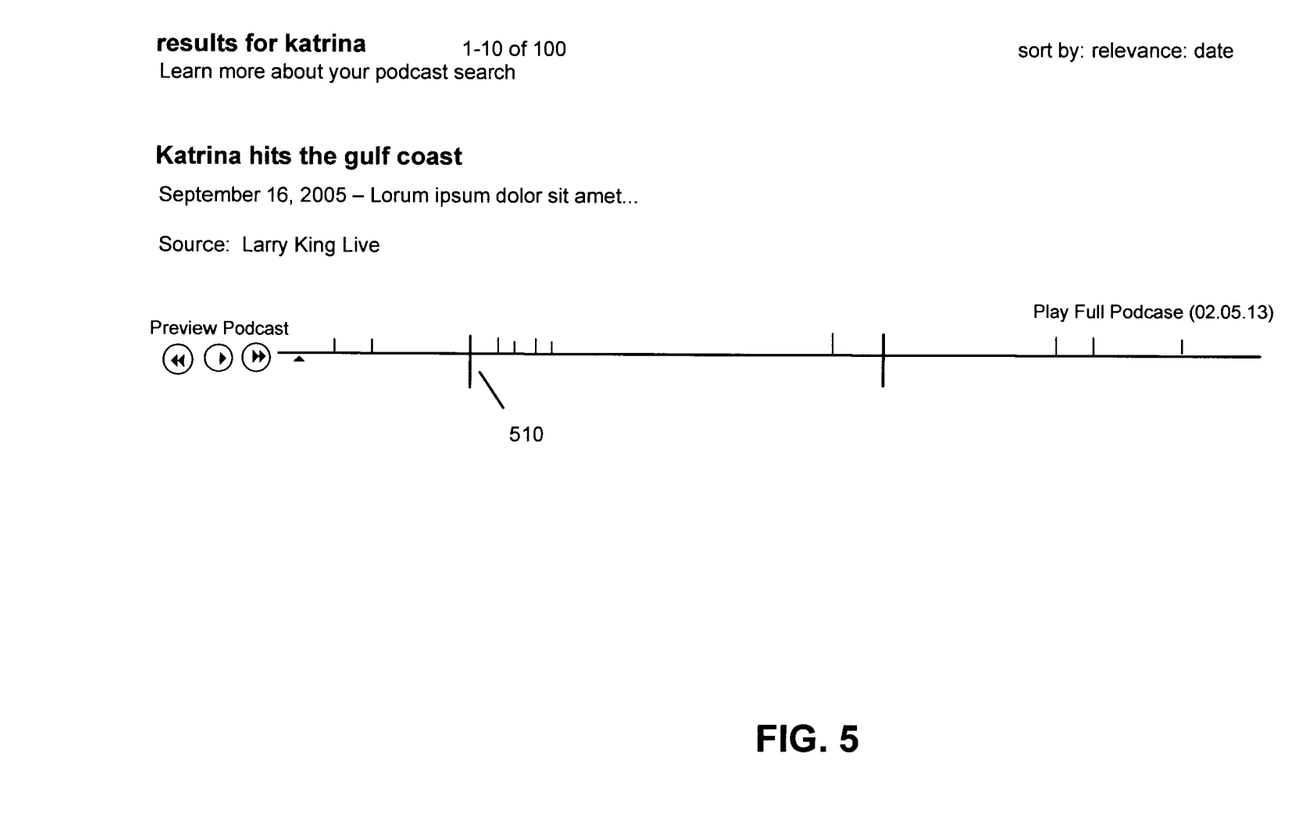
FIG. 5 illustrates a GUI configured to render segment icons that indicate different segments in the rich media file as results responsive to a search query are being rendered.

FIG. 5 illustrates a GUI 500 that is configured to render segment icons that are responsive to a search query as being arranged to indicate different segments in the rich media file. The segment icons 510 may be rendered to display breaks in content or sounds that are associated with constituent parts of the rich media file.

In one implementation, the rich media file is received with an index of chapters with or with metadata representing a location of content within the file. For example, a publisher may transmit a rich media file with segment titles, indicated time(s) and/or file location information (e.g., a second chapter begins 10 kb into a 50 kb file).

Figure 6:
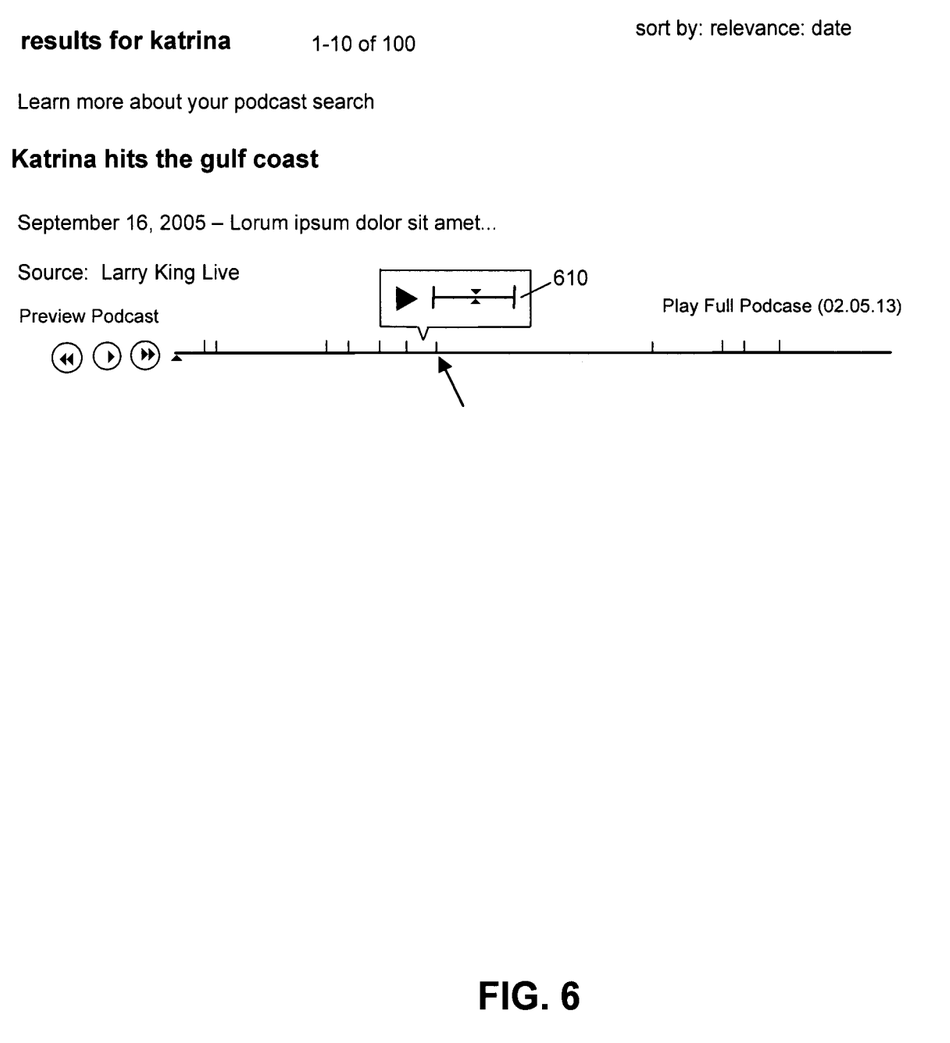
FIG. 6 illustrates a GUI with a supplemental icon structured and arranged to render the rich media file at a user-specified chronological location relative to the actual occurrence of the term.

FIG. 6 illustrates a GUI 600 with a supplemental icon structured and arranged to render the rich media file at a user-specified chronological location relative to the actual occurrence of the term. The supplemental icon 610 is associated with a user-specified chronological location relative to the actual term occurrence (e.g., each occurrence icon may be associated with a launching mechanism in the form of a supplemental icon 610).

In one implementation, a host identifies meaningful contextual information for occurrences of a term. For example, a user may not desire to begin rendering a rich media file at the immediate occurrence of the term. Rather, a user may prefer to render the occurrence of the term with sufficient contextual information so as to make the rendering of the actual occurrence of the term more meaningful. The host may be configured to return results so that selection of a particular result begins a specified amount of time (e.g., 10 seconds) in advance of an occurrence, or at the beginning of a sentence, paragraph, or segment in which the term appears. Alternatively, the host may return information describing potential beginnings so that the user may select when the content will begin. For example, a client may render a supplemental icon configured to let the user select whether (1) a preceding 10 seconds of contextual information, (2) the beginning of a sentence of contextual information, (3) the beginning of a paragraph of contextual information, or (4) the beginning of a segment of contextual information should be used. Since a host may not have access to a script for the rich media file, a paragraph may be identified by identifying signals (e.g., "We report an interesting development in the case of . . . "), by identifying pauses, and/or by identifying a relationship between terms in chronological proximity.

Figure 7:
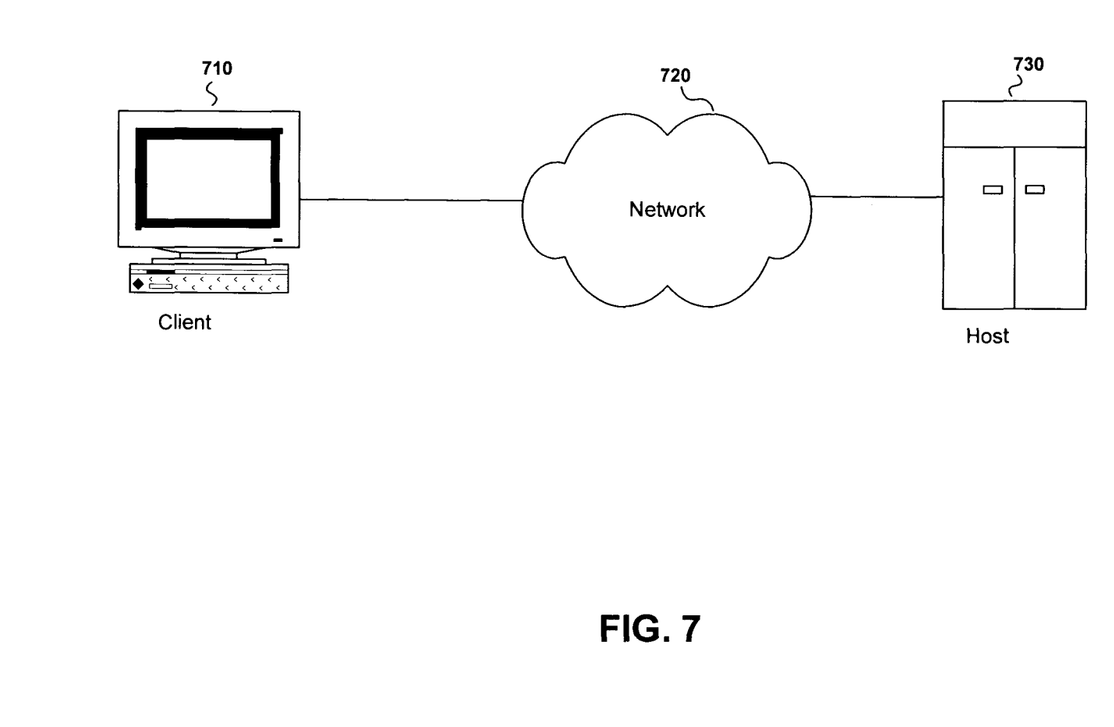
FIG. 7 illustrates a communications system structured and arranged to enable a client to display a chronological representation of search results of rich media files in response to transmitting a search query to a host.

FIG. 7 illustrates a communications system 700 structured and arranged to enable a client to display a chronological representation of search results of rich media files in response to transmitting a search query to a host. The communications system 700 includes a client 710, a network 720, and a host 730. The client 710 may include one or more devices capable of accessing content on the host 730. Although the communications system 700 is shown as a network-based system, the system may access media files residing in a standalone device or in a different configuration. For example, an information kiosk may play content in the form of music encoded in a media file format.

Each of the client 710 and the host 730 may be implemented by, for example, a general-purpose computer capable of responding to and executing instructions in a defined manner (e.g., a personal computer (PC)), a special-purpose computer, a workstation, a notebook computer, a PDA ("Personal Digital Assistant"), a wireless phone, a server, a device, a component, other equipment or some combination thereof capable of responding to and executing instructions. The client 710 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 710 or the host 730.

In one implementation, the client 710 includes one or more information retrieval software applications (e.g., a browser, a mail application, an instant messaging client, an Internet service provider client, a media player, or an AOL® TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 730 may include a wireless telephone running a micro-browser application on a reduced operating system with general purpose and specialized hardware capable of operating in mobile environments.

The client 710 may include one or more media applications. For example, the client 710 may include a software application that enables the client 710 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite station. In another example, the controls may enable the user to rewind or fast-forward a received media stream. For example, if a user does not care for a track on a particular station, the user may interface with a "next track" control that will queue up another track (e.g., another song).

The network 720 may include hardware and/or software capable of enabling direct or indirect communications between the client 710 and the host 730. As such, the network 720 may include a direct link between the client and the host, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Generally, the host 730 includes one or more devices configured to distribute digital content. For instance, a host 730 typically includes a collection or library of content for distribution. Alternatively, or in addition, the host 730 may convert a media source (e.g., a video or audio feed) into a first feed of data units for transmission across the network 720. The host 730 also may include an input/output (I/O) device (e.g., video and audio input and conversion capability), and peripheral equipment such as a communications card or device (e.g., a modem or a network adapter) for exchanging data with the network 720.

The host 730 may include a general-purpose computer having a central processor unit (CPU), and memory/storage devices that store data and various programs such as an operating system and one or more application programs. Other examples of a host 730 include a workstation, a server, a special purpose device or component, a broadcast system, other equipment, or some combination thereof capable of responding to and executing instructions in a defined manner.

The host 730 may include playlisting software configured to manage the distribution of content. The playlisting software organizes or enables access to content by a user community. For example, the host 730 may be operated by an Internet radio station that is supporting a user community by streaming an audio signal, and may arrange a sequence of songs accessed by the user community.

Figure 8:
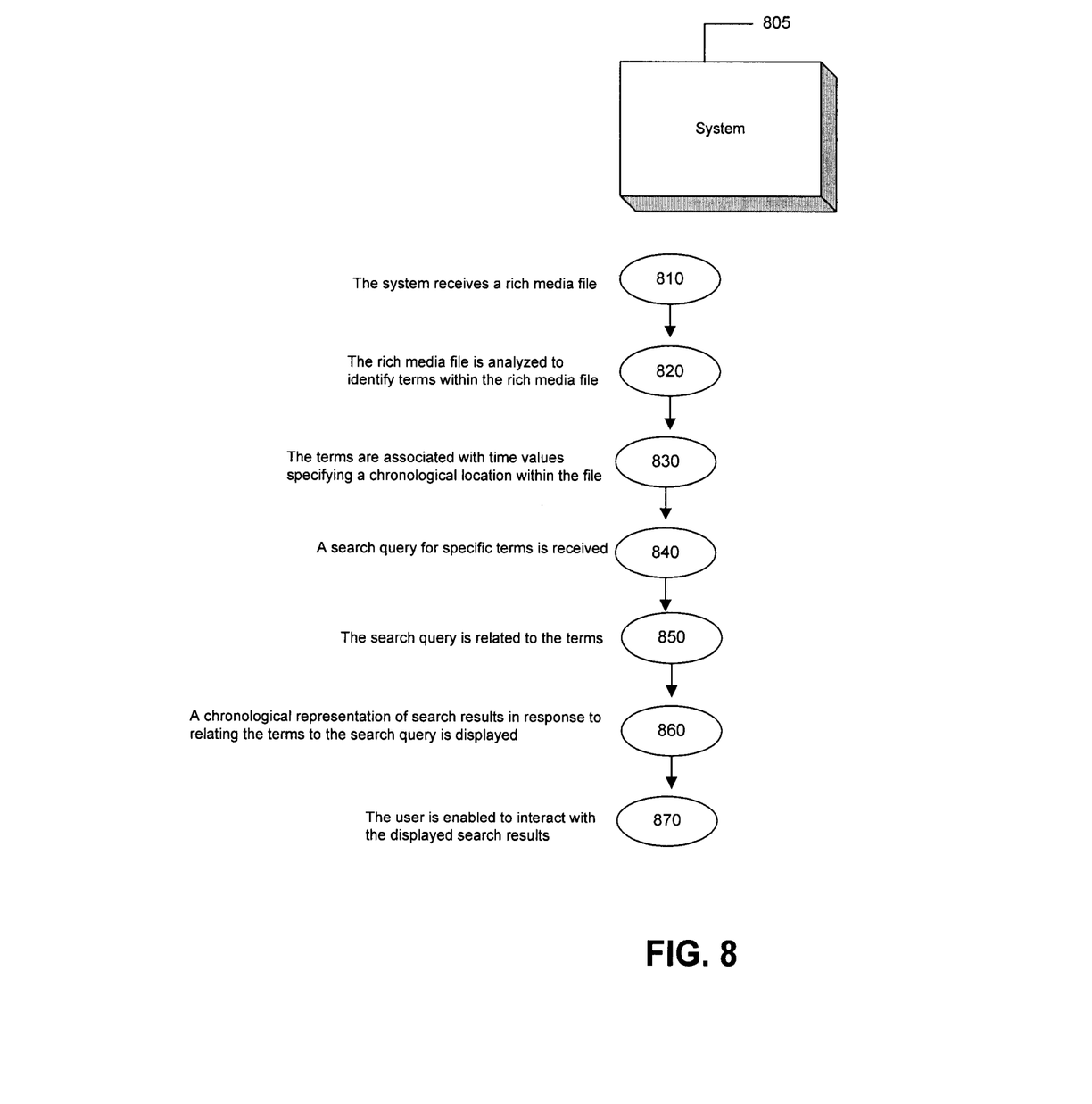
FIG. 8 is a flow chart of an exemplary process by which a user is enabled to interact with search results to launch a rich media application that renders a relevant portion that is responsive to a search query.

FIG. 8 is a flow chart of an exemplary process 800 by which a user is enabled to interact with search results to launch a rich media application that renders a relevant portion that is responsive to the search query. For example, the operations shown in process 800 may be used to render the GUIs shown with respect to FIGS. 1-6. Also, although the operations are described with respect to a system 805, representing a general purpose computer, the operations shown in process 800 may be performed on a client and/or a host (e.g., the client 710 and the host 730 described in FIG. 7).

Initially, the system 805 receives a rich media file (810). Receiving the rich media file may include accessing a database of searchable media. The database may be located within the system 805 or stored in a remote location. For example, a broadcaster may publish an audio file with one or more news stories by transmitting the audio file to an intermediary such as a search provider.

The rich media file is analyzed to identify terms within the rich media file (820). For example, the system 805 may detect an occurrence of a term rendered as a spoken word or a type of image or sound. The system 805 then may separate terms occurring within the rich media file so that subsequent operations may relate search queries to a term (e.g., a system 805 may produce an index with a list of terms occurring within a file for aiding search queries).

The terms are associated with time values specifying a chronological location within the file (830). If, for each file, a list of occurring terms is generated, the list may include time values for each of the occurring terms so as to enable results to be retrieved that are responsive to a search query. The terms may be grouped by proximity such that users may search for a particular sequence of terms or a proximity of a first term with respect to a second term (e.g., within 30 seconds of one another).

A search query is received (840). For example, a user may provide search terms in a web-based interface to a search engine.

The search query is related to the terms (850). For example, the search query may include one or more strings of characters to be searched for occurrence within the rich media files. The strings may match specific term occurrences or may use metadata related to terms in a search query such that a search engine associates a string with related terms.

A chronological representation of search results is displayed in response to relating the terms to the search query (860). The chronological representation may include occurrence markers at chronological locations associated with the search results.

The user is enabled to interact with the displayed search results (870). The display with the chronological representation may include options and controls such as an indication of a chronological location of a starting point of a rendering relative to an actual occurrence of search results. For example, the search results may be displayed in a web page with embedded media player controls.

Figure 9:
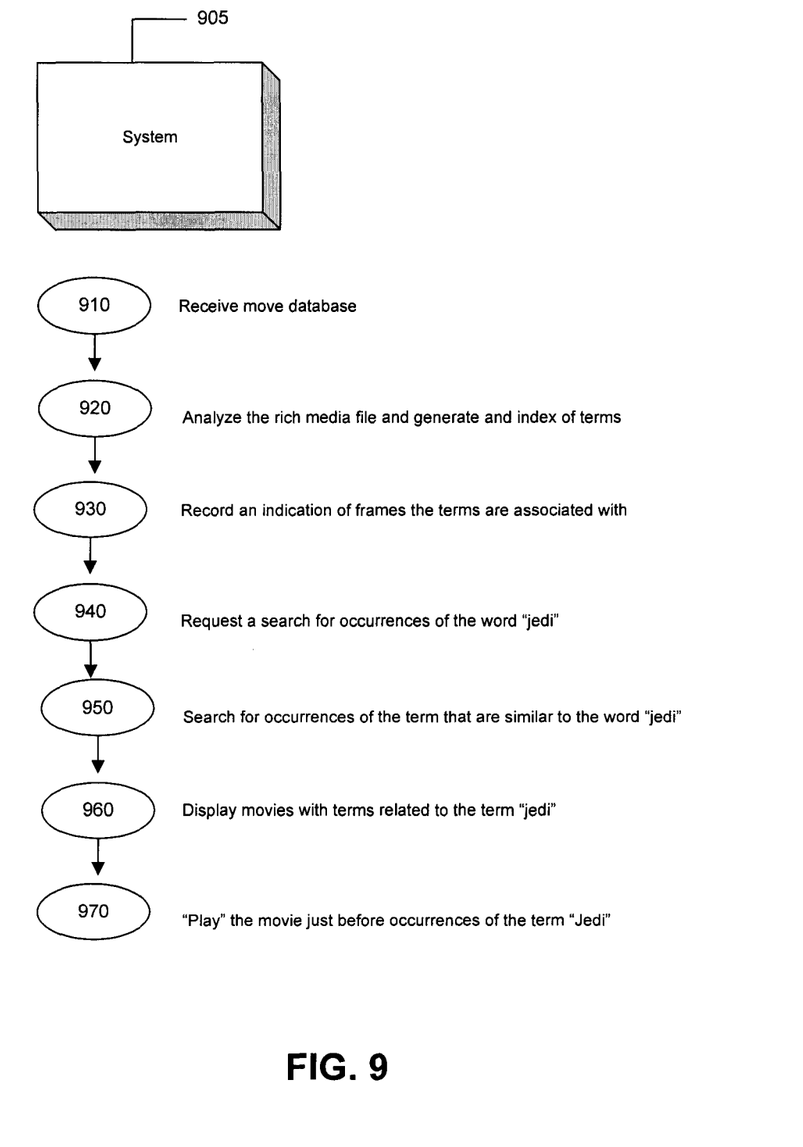
FIG. 9 is a flow chart of an exemplary process by which a user is enabled to interact with search results to launch a rich media application that renders a relevant portion that is responsive to a search query for words within a movie database.

FIG. 9 is a flow chart of an exemplary process 900 by which a user is enabled to interact with search results to launch a rich media application that renders a relevant portion that is responsive to the search query for words within a movie database. In general, the systems and operations described with respect to FIG. 9 relate to the systems and operations described previously with respect to FIGS. 1-8. However, process 900 illustrates one implementation of a user interacting with a system 905 to retrieve search results within a movie database.

Initially, a movie database is received (910). The movie database includes one or more movie files. The system 905 analyzes movie files using a speech-to-text engine, and generates an index of terms that occur in a movie file (920). The speech-to-text engine also records an indication of the frames with which the term(s) are associated (930). Other references may be used, such as a file byte marker (e.g., 100 kb into a 500 kb file).

With at least some of the content in movie database available for analysis, a user requests a search for occurrences of the word "jedi" within the movies database using a web-based search engine (940). The system 905 searches for occurrences of the term that are similar to the word "jedi" within the index of terms (950). Movies with a term related to the term "jedi" are displayed within the search results (960). For example, a media player application with a movie time line displays occurrences of the term "jedi". The media application is configured to render the relevant portion of the movie that is responsive to the search query so as to be meaningful. For example, the media player application may be played just before occurrences of the term (970).

In one implementation, the system 905 analyzes a rich media file for terms that are similar in sound. A search query for the word "jedi," for example, may result in search results that also relate to the phrase "jet fly" within the rich media, where "jet fly" is determined to represent an alternative to an audio instance of "jedi."

Other implementations are within the scope of the following claims. For example, a multi-occurrence icon may be configured to reflect the number of occurrences or the likely degree of relevance. To this end, a multi-occurrence icon may be wider to reflect the duration over which terms are located or more intense (e.g., taller) to reflect a larger number of terms that appear.

Similarly, an icon (e.g., a multi-occurrence icon) may be modified to reflect the occurrence of metadata in the rich media file that is determined to be relevant to the search query. For example, if a term found in a search query only appears once, but the relevant excerpt includes a large number of metadata terms related to the term found in the search query, a narrow blue indicator may be used to reflect the occurrence of the term found in the search query and a red band outside of the narrow blue indicator may be used to reflect the occurrence of metadata terms. If text transcripts are supported, a first distinguishing characteristic (e.g., a blue font color) may be used to render the term found in the search query and a second distinguishing characteristic (e.g., a red font color) may be used to render the metadata terms appearing in the text transcript related to the relevant portion.

A host may scan a rich media file for distinguishing audio characteristics used to distinguish between segments. For example, a host publishing audio files from NBC® (the National Broadcasting Company) may use the presence of NBC®'s distinctive three tone clip to indicate a break in content.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A computer-implemented method of enabling a display of a computer system to render content using one or more processors, the method comprising:
   receiving a rich media file;
   analyzing the rich media file to identify a term within the rich media file;
   associating the term with one or more time values specifying a chronological location in the rich media file for the term;

receiving a search query from user input at a computer system;

relating the search query to the term;

enabling the computer system to render, on a display, a chronological representation of search results in response to relating the term to the search query; and enabling a user to interact with the search results to launch a rich media application that renders, on the display of the computer system, a relevant portion of the rich media file that is responsive to the search query.

2. The method of claim 1 wherein enabling the computer system to render the chronological representation includes enabling the computer system to render one or more text transcripts associated with the search results.

3. The method of claim 1 wherein receiving the rich media file includes receiving at least one of audio or video content.

4. The method of claim 1 wherein enabling the computer system to render the chronological representation includes enabling the computer system to render a multi-occurrence icon representing two or more occurrences of the term that occur within a predetermined chronological proximity.

5. The method of claim 4 wherein enabling the computer system to render the chronological representation includes indicating a number of occurrences of the term within the predetermined chronological proximity.

6. The method of claim 1 wherein enabling the user to interact with the search results includes enabling the user to interact with an execution icon configured to render the relevant portion by beginning to render the relevant portion at a predetermined amount of time in advance of the actual occurrence of the term such that rendering includes contextual content in addition to the desired term.

7. The method of claim 6 wherein rendering the relevant portion includes selecting the contextual context based on breaks in content or a rendering of sound effects that are associated with segments of a program to identify the contextual content.

8. The method of claim 1 further comprising enabling the computer system to render, on the display, segment icons responsive to the search query that are structured and arranged to indicate different segments in the rich media file.

9. The method of claim 1 wherein further comprising enabling the computer system to render, on the display, the rich media file at a user-specified chronological location relative to the actual occurrence of the term.

10. The method of claim 1 wherein receiving the search query from user input at the computer system includes receiving a string of one or more words entered by a user at the computer system.

11. The method of claim 10 wherein:

relating the search query to the term includes relating the one or more words entered by the user at the computer system to the term; and enabling the computer system to render the chronological representation includes enabling the computer system to render indications of occurrences of the one or more words entered by the user at the computer system.

12. A computer-implemented method of enabling a display of a computer system to render content using one or more processors, the method comprising:

receiving a rich media file;

analyzing the rich media file to identify one or more terms within the rich media file;

associating the one or more terms with one or more time values specifying chronological locations in the rich media file;

providing search query functionality enabling a user to search the rich media file for occurrences of a user-specified term;

receiving a search query from a user including a user-specified term input at a computer system;

relating the user-specified term of the search query to the identified one or more terms to determine one or more occurrences of the user-specified term in the identified one or more terms within the rich media file;

enabling the computer system to render, on a display and in response to the related search query, a chronological representation associated with the rich media file and including at least one indication of the determined occurrence of the user-specified term in response to relating the user-specified term of the search query to the identified one or more terms; and enabling the user to interact with the chronological representation to launch a rich media application that renders, on the display of the computer system, a portion of the rich media file that is responsive to the search query.

13. A computer-implemented method of enabling a display of a computer system to render content using one or more processors, the method comprising:

receiving a rich media file;

analyzing the rich media file to identify one or more terms within the rich media file;

associating the one or more terms with one or more time values specifying chronological locations in the rich media file;

receiving a search query from user input at a computer system;

relating the search query to the term;

enabling the computer system to render, on a display and in response to the related search query, a chronological representation associated with the rich media file and with at least one indication of the term such that the position of the indication of the term in the chronological representation is based on the time value associated with the term; and enabling a user to interact with the chronological representation to launch a rich media application that renders, on the display of the computer system, a portion of the rich media file that is responsive to the search query.

14. A computer-implemented method of enabling a display of a computer system to render content using one or more processors, the method comprising:

receiving a rich media file;

analyzing the rich media file to identify one or more terms within the rich media file;

associating the one or more terms with one or more time values specifying chronological locations in the rich media file;

providing search query functionality enabling a user to search the rich media file for occurrences of a user-specified term;

receiving a search query from a user including a user-specified term input at a computer system;

relating the user-specified term of the search query to the identified one or more terms to determine one or more occurrences of the user-specified term in the identified one or more terms within the rich media file;

enabling the computer system to render, on a display and in response to the related user-specified term of the search query to the identified one or more terms, a chronological representation associated with the rich media file and with at least one indication of the determined occurrence of the user-specified term such that the position of the indication of the determined occurrence of the user-specified term in the chronological representation is based on the time value associated with the term; and enabling the user to interact with the chronological representation to launch a rich media application that renders, on the display of the computer system, a portion of the rich media file that is responsive to the search query.

15. The method of claim 14 wherein enabling the computer system to render the chronological representation includes enabling the computer system to render a multi-occurrence icon representing two or more occurrences of the user-specified term that occur within a predetermined chronological proximity.

16. The method of claim 14 wherein enabling the computer system to render the chronological representation includes indicating a number of occurrences of the user-specified term within a predetermined chronological proximity.

17. The method of claim 14 wherein receiving the rich media file includes receiving an audio file.

18. The method of claim 14 wherein further comprising enabling the computer system to render, on the display, the rich media file at a user-specified chronological location relative to the actual occurrence of the user-specified term.

19. The method of claim 14 wherein enabling the user to interact with the chronological representation includes enabling the user to interact with an execution icon configured to render the relevant portion by beginning to render the relevant portion at a predetermined amount of time in advance of the actual occurrence of the user-specified term such that rendering includes contextual content in addition to the user-specified term.

20. The method of claim 19 wherein enabling the computer system to render the relevant portion includes selecting the contextual context based on breaks in content or a rendering of sound effects that are associated with segments of a program to identify the contextual content.

* * * * *